(12) United States Patent
Eydelman

(10) Patent No.: US 7,962,402 B2
(45) Date of Patent: Jun. 14, 2011

(54) ON-LINE SYSTEM FOR BUYER SELLER MATCHING AND NEGOTIATION

(76) Inventor: Lev Eydelman, Plymouth, MN (US)

( * ) Notice: Subject to any disclaimer, the term of this patent is extended or adjusted under 35 U.S.C. 154(b) by 776 days.

(21) Appl. No.: 11/238,867

(22) Filed: Sep. 29, 2005

(65) Prior Publication Data
US 2007/0073607 A1    Mar. 29, 2007

(51) Int. Cl.
*G06Q 40/00* (2006.01)
(52) U.S. Cl. ........ 705/37; 705/14.4; 705/14.53; 705/35; 705/26.4
(58) Field of Classification Search .......................... None
See application file for complete search history.

(56) References Cited

U.S. PATENT DOCUMENTS

| | | | | |
|---|---|---|---|---|
| 6,141,653 | A * | 10/2000 | Conklin et al. ................. | 705/80 |
| 7,430,523 | B1 * | 9/2008 | Khalidi ........................ | 705/26.4 |
| 2001/0009005 | A1 * | 7/2001 | Godin et al. .................... | 705/37 |
| 2002/0010636 | A1 * | 1/2002 | Immel ............................. | 705/26 |
| 2002/0046160 | A1 * | 4/2002 | Conwell, III ................... | 705/39 |
| 2002/0147674 | A1 * | 10/2002 | Gillman .......................... | 705/37 |
| 2003/0195837 | A1 * | 10/2003 | Kostic et al. .................... | 705/37 |
| 2004/0215550 | A1 * | 10/2004 | Preist et al. ..................... | 705/37 |
| 2004/0267818 | A1 * | 12/2004 | Hartenstine ................ | 707/104.1 |
| 2005/0144098 | A1 * | 6/2005 | Vance et al. ..................... | 705/35 |
| 2005/0171859 | A1 * | 8/2005 | Harrington et al. ............ | 705/26 |
| 2005/0273417 | A1 * | 12/2005 | Budish ............................ | 705/37 |
| 2006/0041500 | A1 * | 2/2006 | Diana et al. ..................... | 705/37 |
| 2006/0085318 | A1 * | 4/2006 | Cohoon .......................... | 705/37 |
| 2006/0149656 | A1 * | 7/2006 | Chefalas et al. ................ | 705/37 |
| 2006/0167784 | A1 * | 7/2006 | Hoffberg ........................ | 705/37 |
| 2007/0203820 | A1 * | 8/2007 | Rashid ............................ | 705/37 |

* cited by examiner

*Primary Examiner* — Narayanswamy Subramanian
*Assistant Examiner* — Ed Baird

(57) ABSTRACT

An on-line system for creating an open market for matching buyers and sellers of brand name products. The system enables buyers to achieve the maximum value in the purchased product by engaging in an open ended on-line reverse auction and a negotiation process with multiple sellers of the specified product. The system enables sellers to generate sales leads and engage in the open ended on-line reverse auction bidding and the negotiation process with buyers.

12 Claims, 12 Drawing Sheets

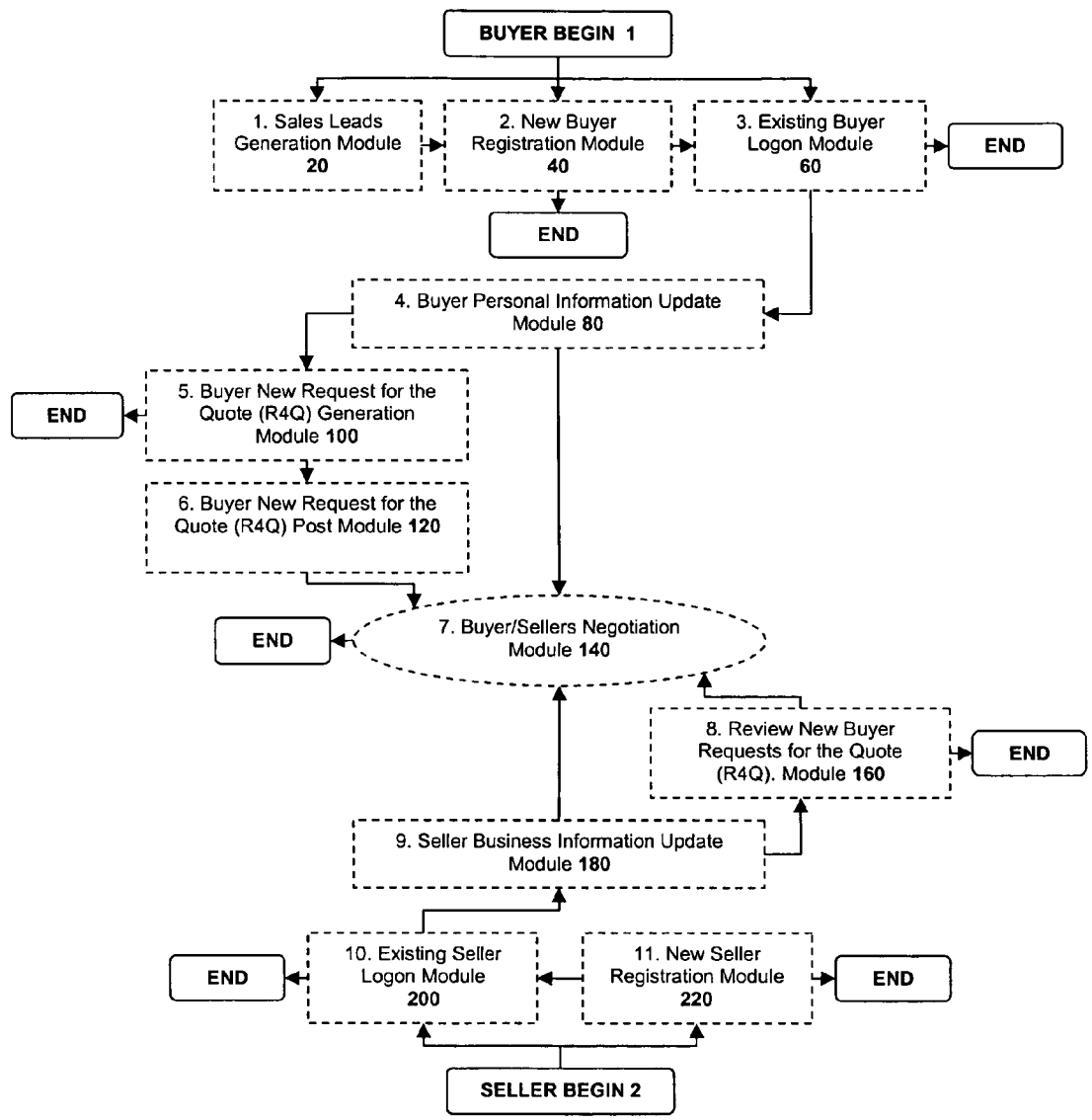
Figure 1 - System Functional Diagram

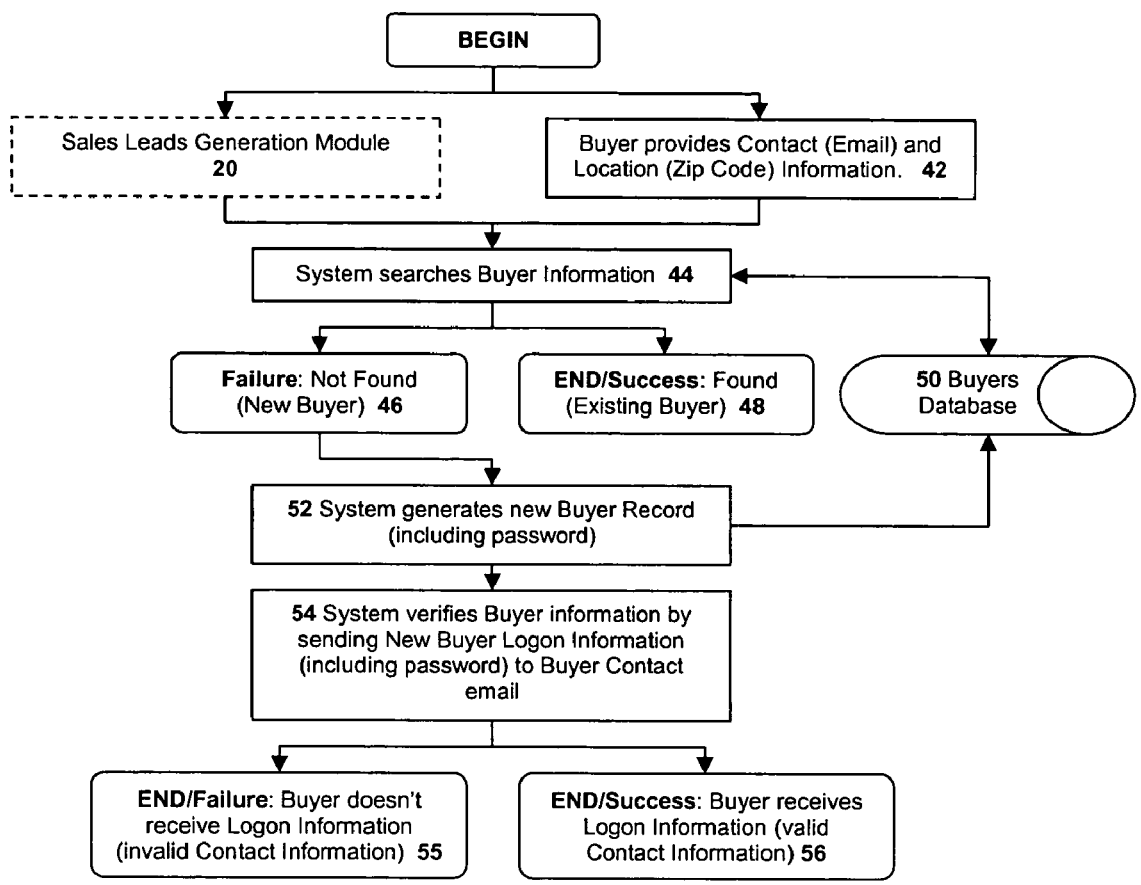
Figure 2 - New Buyer Registration Module

Figure 3 - Existing Buyer Logon Module
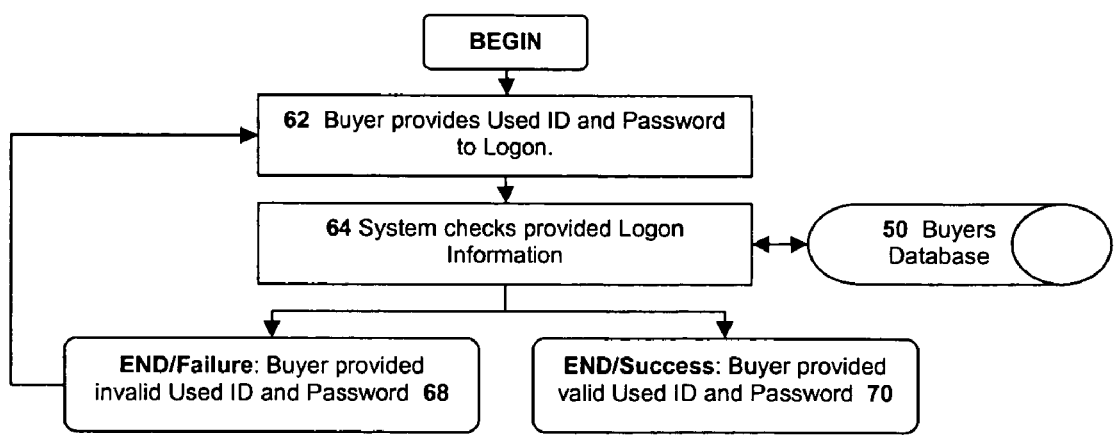

Figure 4 - Buyer Personal Information Update Module
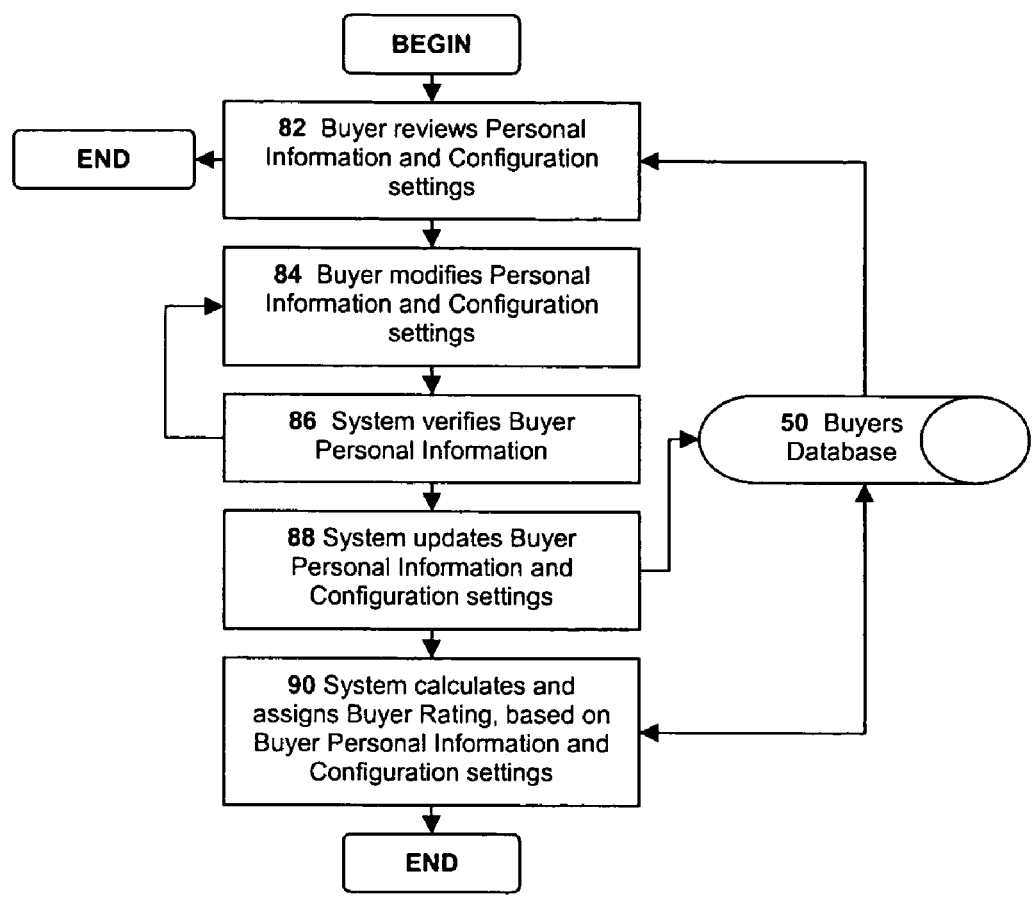

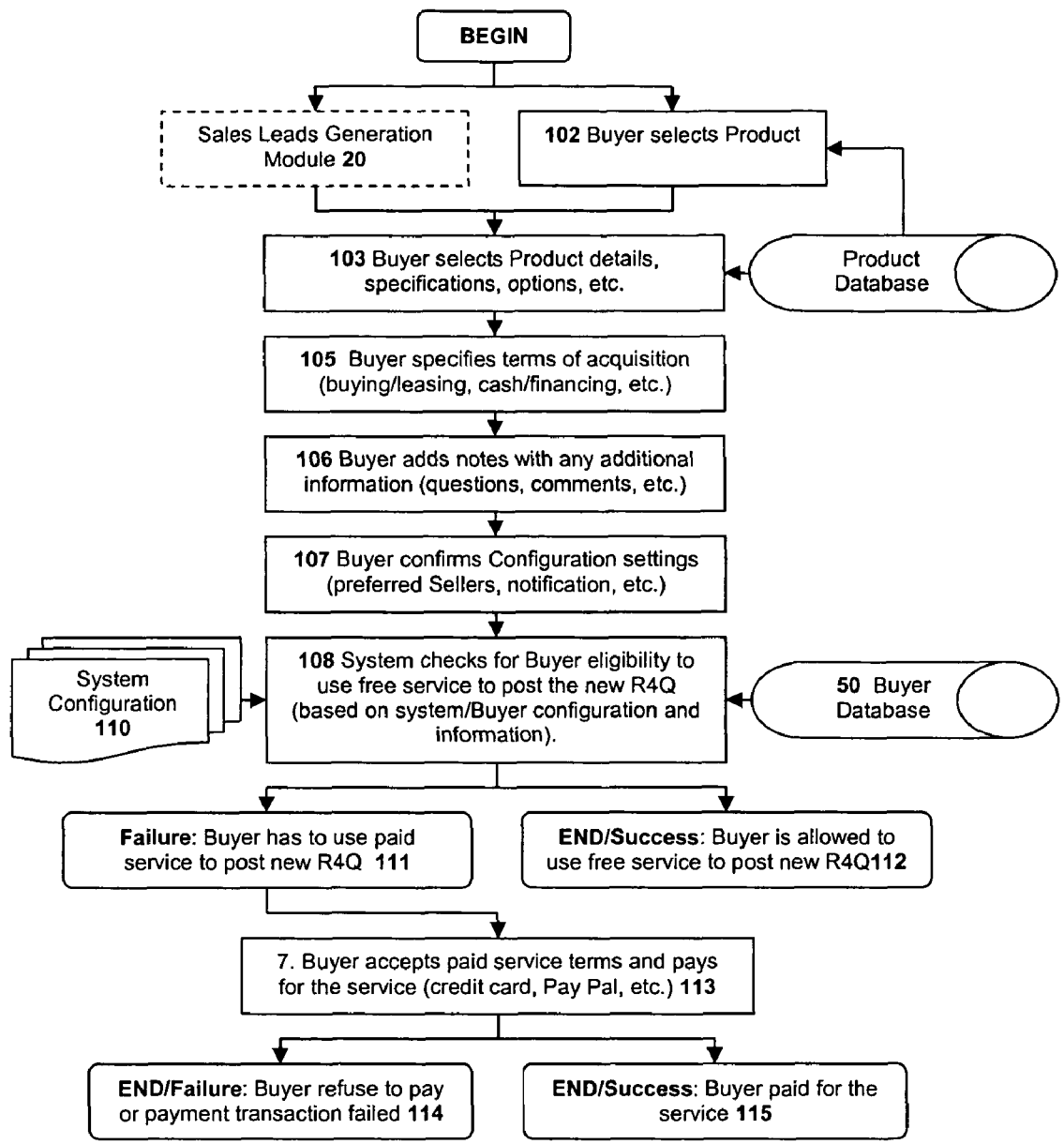
Figure 5 - Buyer Request for the Quote (R4Q) Generation Module

Figure 6 - Buyer Request for the Quote (R4Q) Post Module
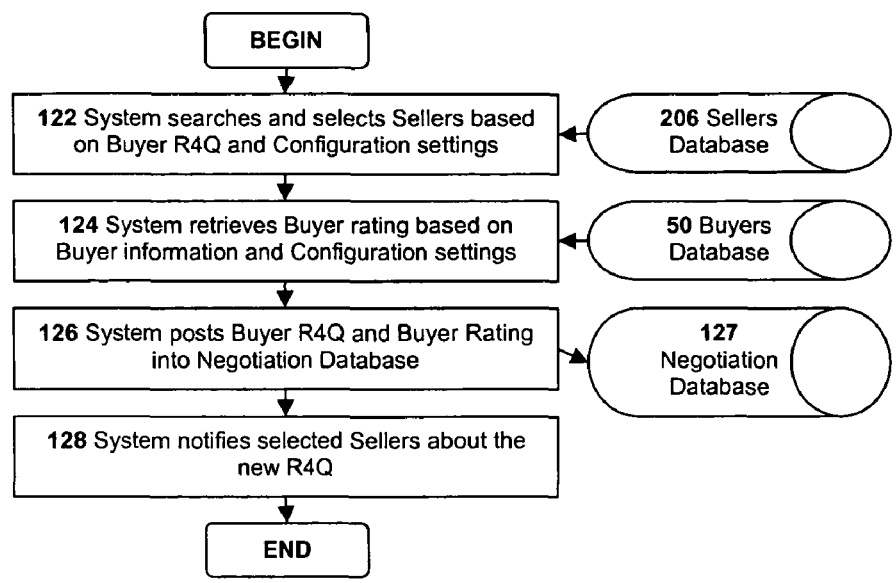

Figure 7 - Buyer/Sellers Negotiation Module
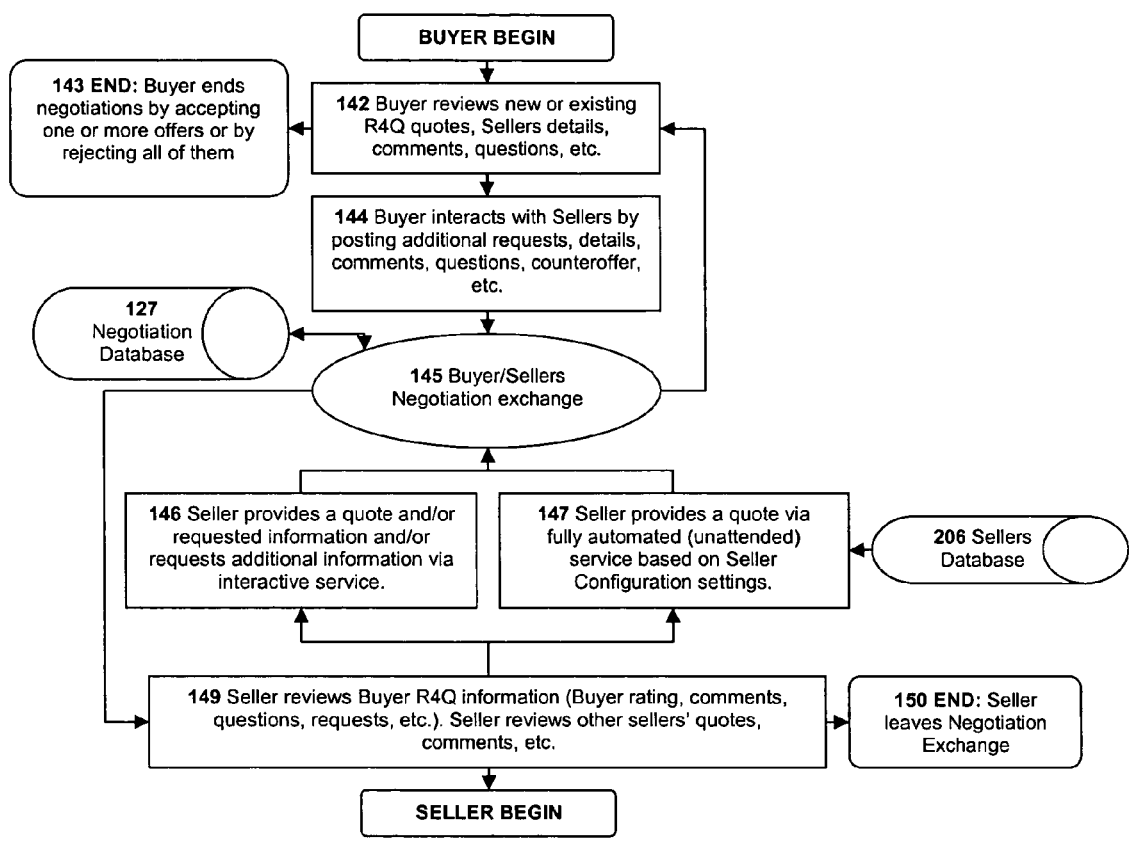

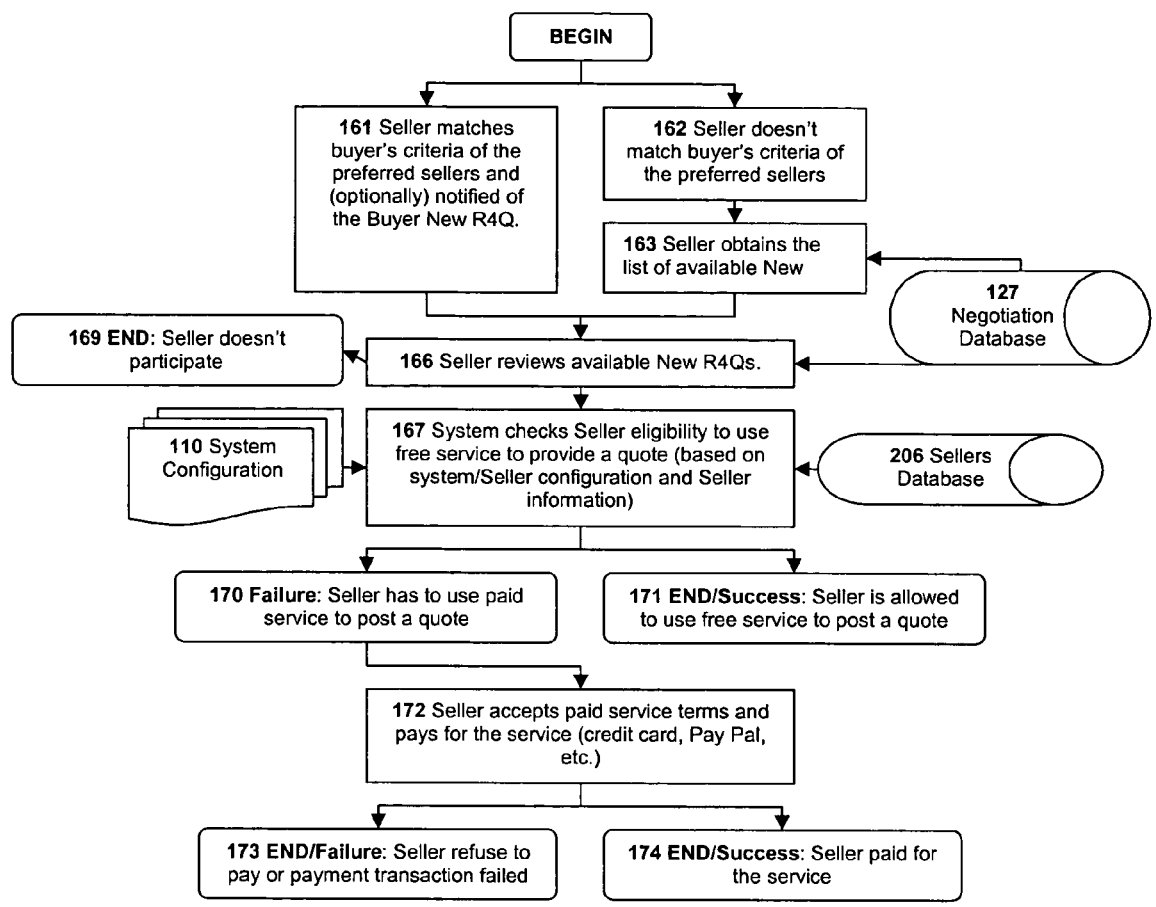
Figure 8 – New Requests for the Quote (R4Q). Module

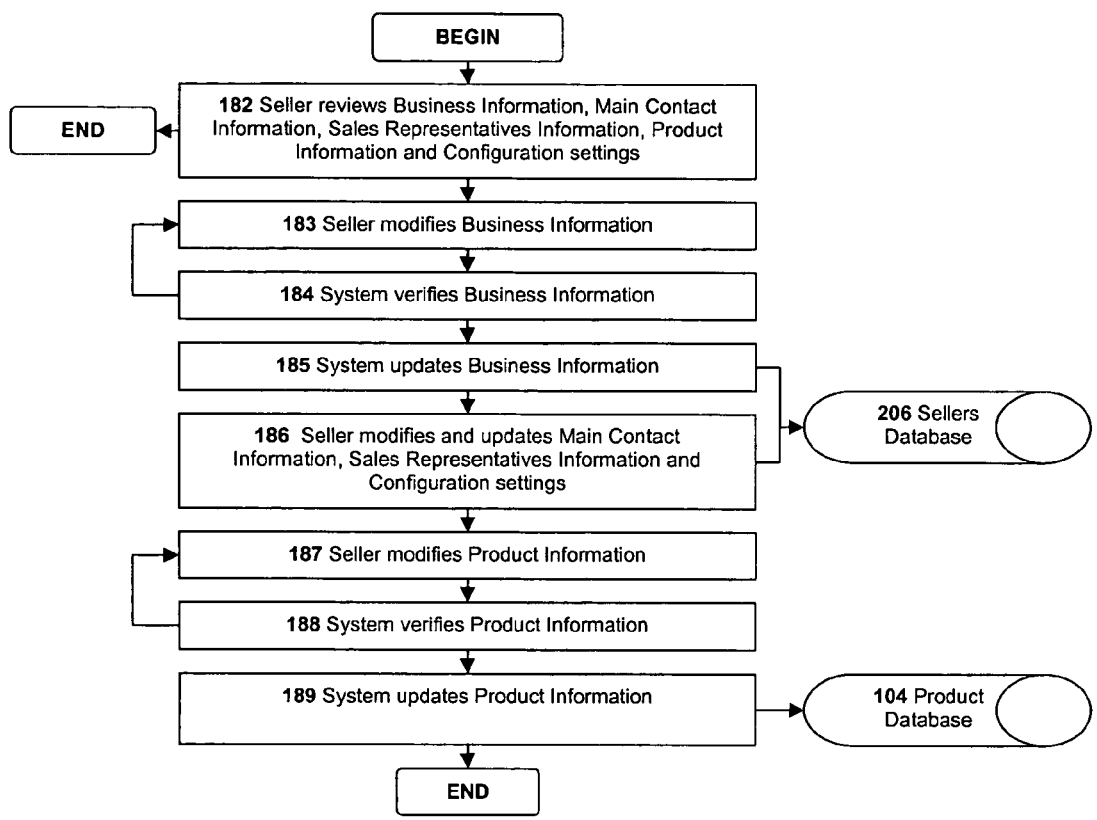
Figure 9 - Seller Business Information Update Module

Figure 10 - Existing Seller Logon Module
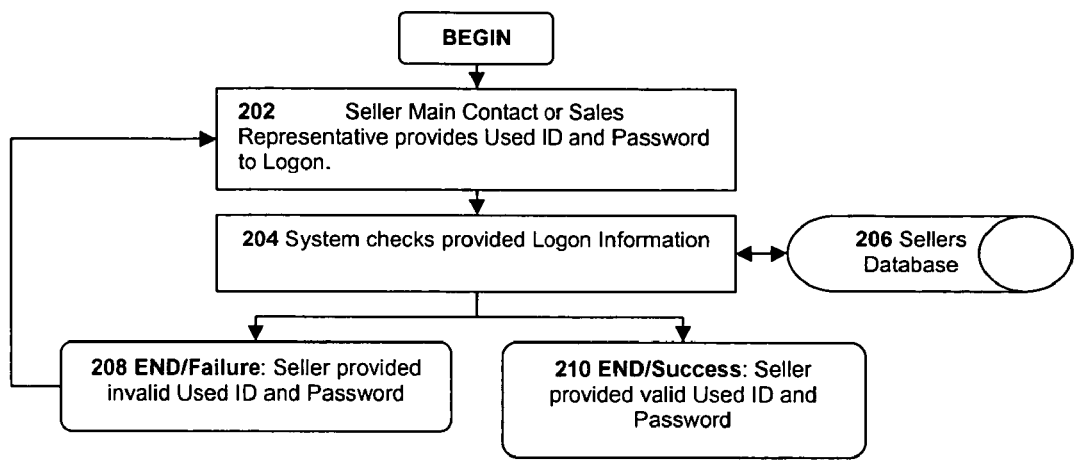

Figure 11 - New Seller Registration Module
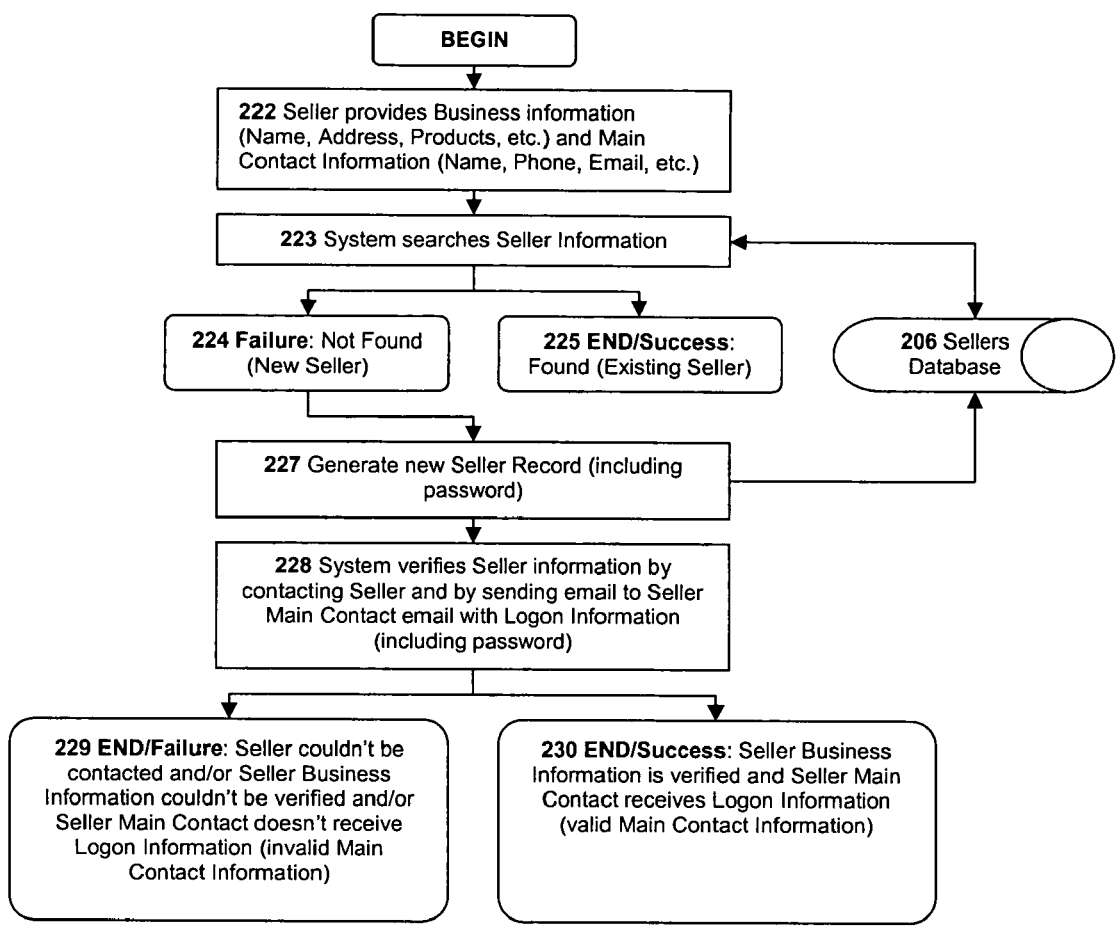

Figure 12 – Sales Leads Generation Module
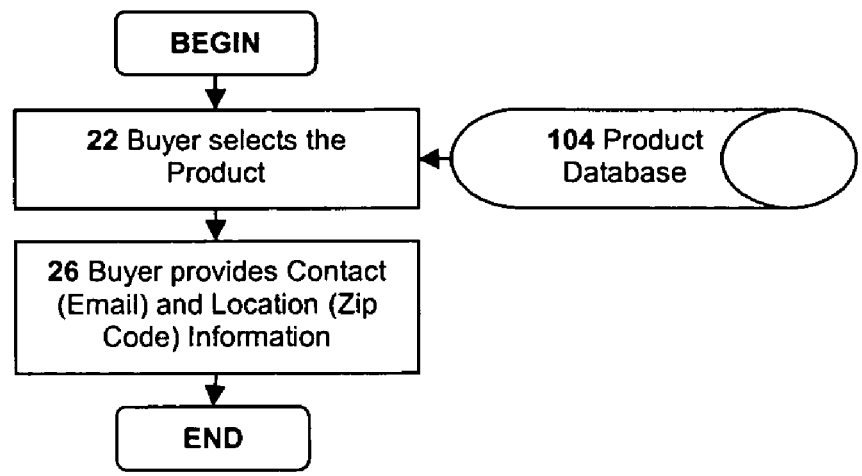

ON-LINE SYSTEM FOR BUYER SELLER MATCHING AND NEGOTIATION

FIELD OF THE INVENTION

The present inventions relate generally to electronic commerce on distributed networks such as the Internet, and more specifically to on-line matching and negotiation between buyers and sellers of brand name products.

BACKGROUND OF THE INVENTION

A brand name product is an easily comparable identical or almost identical product manufactured by the same manufacturer that is freely available from numerous sellers. Brand name products (for example, cars, TVs, and refrigerators) are bought and sold on-line in many different ways.

Under the fixed price approach, brand name products are sold at the manufacture's or retailer's websites at a fixed price. Reference websites apply a variation of the fixed price approach by posting lists of prices of the same product available from multiple sellers. Very often the price list information is not accurate and up-to-date. To achieve maximum value when purchasing a product by the fixed price approach, a potential buyer has to engage in both on-line and off-line negotiations with each particular seller, which is a time consuming and an ineffective process for both parties. The buyer in most cases is not able to receive the best deal because each particular seller is not aware of quotes provided by other sellers. Similarly, because sellers are not aware of quotes provided by other sellers, a particular seller is not able to provide a competitive quote.

A referral service is another way of buying and selling brand name products online. A buyer specifies the product and provides contact information and the referral service informs a limited number of sellers (usually local) of the potential buyer. Sellers then begin to contact the potential buyer. To achieve maximum value, the buyer has to engage in both an on-line and off-line negotiation process with each particular seller. The referral method is widely used in buying and selling vehicles. Examples include www.autobyte1.com, www.edmunds.com, autos.msn.com, autos.yahoo.com, and www.kbb.com. A referral service has the same limitations and disadvantages as the fixed price approaches.

A reverse auction where invited sellers bid to win a deal is another way for a potential buyer to achieve a better price for a brand name product. Designed to achieve the best price, a reverse auction has many limitations that prevent a buyer from gaining the best value. While price is one of the most important parameters that a buyer considers when making a purchase decision, parameters such as availability of the product, cost of delivery, warranty, customer service, financing and other seller value added products and services are also very important to a buyer Thus, existing systems require time consuming and inefficient negotiations between the buyer and seller, do not allow the buyer to achieve the best price, do not allow the seller to provide value in addition to price, and do not allow the buyer to consider the additional value in the buyer's decision making process.

SUMMARY OF THE INVENTION

The present invention satisfies the above-mentioned needs and provides additional advantages and improvements that will be recognized by those skilled in the art upon review of the present disclosure by eliminating time consuming and inefficient negotiations between the buyer and the seller, allowing the buyer to achieve the best price, allowing the seller to provide value in addition to price, and allowing the buyer to consider the additional value in the buyer's decision making process.

The present invention combines an on-line reverse auction environment with an on-line open ended negotiation process to produce greater product value for the buyer as well as higher sales for the sellers by generating more high quality sales leads. The present invention creates a flexible open ended on-line reverse auction environment through an on-line negotiation module, where buyers will be able to clarify and/or modify their requests and provide relevant information requested by the sellers. Sellers will be able to provide buyers with competitive bids and also with available value added products and services that define overall value of the specified product through the negotiation module. The buyer may consider information that the seller chooses to provide and the buyer may request additional information from the seller. Similarly, the seller may request information from the buyer and the seller may provide information. The buyer may weigh the information provided by the seller subjectively and then choose to complete or not complete a transaction.

The present invention provides buyers and sellers with the ability to determine the rating or quality of the opposite party in order to increase effectiveness of the negotiation process.

The present invention creates an open market for matching buyers and sellers of brand name products implemented through a computer program residing on one or more web servers and accessible to parties with access to the World Wide Web.

The present invention allows both buyers and sellers to engage in on-line reverse auctions and on-line negotiation processes in order to complete the transaction.

The present invention allows buyers to achieve maximum value in a purchased product by comparing not only the price quotes provided by multiple sellers, but also by evaluating value added products and services available from the sellers, such as warranty, financing, and customer service.

The present invention allows sellers to compete more efficiently in the environment where they can provide not only the price quote, but also the available value added products and services, such as warranty, financing, and customer service that define the overall value of the purchased product.

The present invention also allows sellers to compete with high confidence, since each quote fully discloses verifiable seller information such as a business name, address, sales representative name, phone, and email.

The present invention also allows sellers to evaluate the buyer rating and lead quality based on buyer provided information prior to providing a quote. A seller may request additional information from the buyer in order to increase the buyer rating and lead quality. If the buyer rating or lead quality is not sufficient, a seller may choose not to participate in an on-line reverse auction and negotiation process.

The present invention also allows for generating sales leads by embedding sales leads generation software module into the affiliated websites.

BRIEF DESCRIPTION OF THE DRAWINGS

FIG. 1 illustrates the System Functional Diagram which is a high level block diagram of the system;

FIG. 2 illustrates the flow chart of the New Buyer Registration module;

FIG. 3 illustrates the flow chart of the Existing Buyer Logon module;

FIG. 4 illustrates the flow chart of the Buyer Personal Information Update module;

FIG. 5 illustrates the flow chart of the Buyer Request for the Quote (R4Q) Generation module;

FIG. 6 illustrates the flow chart of the Buyer Request for the Quote (R4Q) Post module;

FIG. 7 illustrates the flow chart of the Buyer/Seller Negotiation module;

FIG. 8 illustrates the flow chart of the New Requests for the Quote (R4Q) module;

FIG. 9 illustrates the flow chart of the Seller Business Information Update module;

FIG. 10 illustrates the flow chart of the Existing Seller Logon module;

FIG. 11 illustrates the flow chart of the New Seller Registration module; and,

FIG. 12 illustrates the flow chart of the Sales Leads Generation module.

DETAILED DESCRIPTION OF THE INVENTION

The System Functional Diagram, shown in FIG. 1, is a high level block diagram of a system according to the present invention that implements an open ended on-line reverse auction and negotiation process between a buyer of a particular brand name product and multiple sellers of the particular brand name product. Detailed block diagrams of the components of the system according to the present invention are presented in FIGS. 2-12 for each of the blocks in the System Functional Diagram shown in FIG. 1.

Since systems according to the present invention are implemented as one or more computer programs residing on one or more web servers accessible via the World Wide Web, an unlimited number of instances of the open ended on-line reverse auction and negotiation processes can coexist at the same time. For example, a particular buyer can be involved simultaneously in negotiation with multiple sets of sellers while buying different kinds of brand name products, and a particular seller can be involved simultaneously in the negotiation with multiple buyers while selling the same brand name product. All required input data is collected from and the computed results are presented to buyers and sellers in the form of web pages displayed within a web browser application.

A system according to the present inventions may function in the following way. First, the open ended on-line reverse auction and negotiation process is initiated by the buyer 1 who creates a request for a quote for a particular brand name product, as shown in FIG. 1.

A new unregistered with the system buyer starts by selecting the brand name product from the products database, providing contact information including email and submitting the request 40. The new unregistered with the system buyer uses Sales Leads Generation module 20, also shown in FIG. 12, embedded into system's main or affiliated web sites to create a new request for the quote 22. Then, the New Buyer Registration module 40, as shown in FIG. 2, searches 44 buyers database 50 to determine if the provided contact information 26 matches an existing buyer record 50. If the provided contact information 42 doesn't match an existing buyer record, the system creates a new buyer record in the buyer database 50, generates a secure password and user id 52, and, in order to verify the contact information provided by the buyer 54, sends an Email message containing the new buyer registration and logon information, such as the new buyer user id and password, to the email address provided by the buyer. If the email address provided by the buyer is valid 56, buyer receives the email message and using logon information that was sent, signs in with the system via "Existing Buyer Logon" module 60 shown in FIG. 3. No logon information is sent if the email address provided by the buyer is not valid 55. Successful logon of the new buyer validates a new buyer record in the buyers database 50.

An existing registered with the system buyer starts by logging in to the system 60 with an existing user id and password. Alternatively, an existing registered with the system buyer can submit the new request for the quote using Sales Leads Generation module 20, also shown in FIG. 12, embedded into the system main or affiliated web sites. Once the system detects that the provided contact information 26 matches the existing buyer's database record 50, the buyer is prompted to sign in to the system via the Existing Buyer Logon module 60, FIG. 3, to finalize the request for the quote.

Once logged on, the buyer can modify and update personal information such as name, address, and phone number 84 as well as configuration settings 84 such as preferred sellers and notification using Buyer Personal Information Update module 80, which is shown in detail in FIG. 4. The system verifies the personal information entered by the buyer 86 and then the system updates the personal information 88 in the buyers database 50. During the update, the system calculates and assigns buyer's rating 90 based on the provided information that allow sellers to determine the quality of this particular sale lead.

In the next step, using the Buyer Request for the Quote Generation module 100, which is shown in detail in FIG. 5, buyer creates or finalizes the request for the quote. If partial product information came from the Sales Leads Generation module 20, FIG. 12, buyer continues with specifying product details such as specifications and options 103. Otherwise, the buyer first selects the product 102 from the product database 104. Then the buyer specifies the preferred terms of acquisition such as buying or leasing, cash or financing 105, and confirms or modifies the settings such as preferred sellers and notification 107, adds additional information such as comments and questions 106, and passes over the control to the system to actually post the request 108. Optionally, based on the system configuration 110, buyer may have to pay a fee in order to be able to post a request for the quote. In this case system prompts buyer to accept the charge 113 and then posts the request 115. If the buyer refuses to pay or the payment transaction fails, the transaction is terminated 114. Otherwise, the buyer is allowed to use the free service to post a request for a quote 112.

The Buyer Request for the Quote Post 120 module shown in FIG. 6 implements actual posting of the buyer request. The system searches the seller's database 206 to select sellers of the product specified in buyer's request for the quote. The system retrieves the assigned buyer's rating 124, posts buyer's request with the buyer rating 126 into the negotiation database 127, and notifies the preferred sellers 128 selected based on the buyer's preferences in configuration settings via an email message about the new request for the quote on a product.

Sellers enter the system 2, as shown in FIG. 1, either through the Existing Seller Logon Module 200, details of which are shown in FIG. 10, or through the New Seller Registration Module 220, details of which are shown in FIG. 11. In order for a seller to enter into the on-line reverse auction and negotiation process with a buyer, the seller must be registered with the system. A new unregistered with the system seller uses the New Seller Registration module 220, FIG. 11, to provide business information such as business name, address, and products 222, as well as a main contact information such as main contact name, phone, and email address 222. The system searches the sellers database 206 to determine if provided information matches any existing seller record. If the provided information does not match any existing record 224, the system creates 227 a new seller record in the sellers database 206 and generates user id and associated secure password 227. The system's seller support contacts seller to verify provided business information 228. Once business information is verified, the system sends an email message containing new seller registration and logon information, such as the new seller user id and password, to the seller's main contact Email address 230. If the Email address provided by the seller is valid, the seller receives the Email message and using logon information that was sent, signs in with the system via Existing Seller Logon module 200 shown in FIG. 10. Successful logon of the new seller validates a new seller record in the sellers database 206.

An existing registered with the system seller starts by logging in to the system with an existing user id and password according to the Existing Seller Logon module 200 of FIG. 10. The seller provides an id and password 202 to logon and the system then checks the id and password 204 against the sellers database 206. If the id and password are valid, the seller is allowed to logon 210. If the id and password are not valid, then logon is not allowed 208.

Once logged on, a seller can review the business information 182 and modify the business information 183 and product information 189 through the Seller Business Information Update module 180 of FIG. 9. The system contacts 184 seller to confirm and verify the business information and the system updates the business information 185. The system contacts 190 seller to confirm and verify product information and the system updates business information 191. Using the Seller Business Information Update module 180, seller can add, modify, and update main contact information, sales representative information, and configuration settings 186.

In the next step, the seller can review new requests for the quote posted by the buyer through the New Requests for the Quote module 160 shown in FIG. 8. New requests for quotes are automatically presented to the seller 161 if the particular seller matches the criteria of the preferred sellers defined in the buyer's configuration settings. If the seller doesn't match buyer's preferred seller criteria 162, the seller can obtain the list of the new requests for quotes for products this particular seller is authorized to sell by specifying the location such as zip codes or state(s) 163. Using the specified location information, the system searches the negotiation database 127 for the newly posted requests for quotes for the specified product and presents the list of the new requests to the seller.

After reviewing the list of the new requests for the quote, the seller may decide to engage into one or more on-line reverse auction(s) and negotiation process(es) with the buyer (s) in order to provide a quote 167. Optionally, based on the system configuration, the seller may have to pay a fee in order to be able to provide the quote 170. In this case the system prompts the seller to accept the charge 170 and then allows the seller to enter on-line reverse auction and negotiation process with the buyer 174. The seller may be allowed to use the free service to post a quote 171. The module checks for acceptance of the paid service terms 172 and cancels the transaction if the seller refuses to pay or the payment transaction fails 173.

The "Buyer/Sellers Negotiation" module 140, FIG. 7, implements the on-line reverse auction and negotiation process functionality of the present invention. Designed in a form of a forum, this module allows the buyers and sellers to communicate with each other.

The buyer reviews quotes, comments, requests, questions, and other information posted by seller 142 and, if necessary, communicates back to the seller with the relevant information 144. At some point in the negotiation 145, the buyer can accept or reject the sellers' offers 143, effectively ending the negotiation.

The seller reviews new or existing requests for quotes 149, additional information provided by the buyer 149, buyer's ration information 149, quotes and information provided by other sellers 149 and can provide the quote as well. The seller may opt to leave the negotiation exchange 150. The seller may choose to provide the quote and any additional information interactively 146, or in a fully automated mode 147. To use the fully automated mode, the seller specifies in a configuration setting the product's highest and the lowest price 147. The system checks quotes available from other sellers and, if possible, provides the lowest quote that is higher than the seller's predetermined lowest price for the product. The system stops bidding if the provided quote is the lowest, or if it reaches the seller's predetermined lowest price for the product.

Although specific embodiments and methods of use have been illustrated and described herein, it will be appreciated by those of ordinary skill in the art that any arrangement that is calculated to achieve the same purpose may be substituted for the specific embodiments and methods shown. The same or different computer languages and tools for performing these operations could be used, as understood by those skilled in the art to which the present invention pertains. Certain tools and interfaces such as cookies, applets, and web browser windows are considered part of the invention and are not explicitly delineated in this disclosure as such would be readily created by those skilled in the art to which the present invention pertains. It is to be understood that the above description is intended to be illustrative and not restrictive. Combinations of the above embodiments and other embodiments as well as combinations of the above methods of use and other methods of use will be apparent to those having skill in the art upon review of the present disclosure. The scope of the present invention should be determined with reference to the appended claims, along with the full scope of equivalents to which such claims are entitled.

I claim the following:

1. An interne based communication method for conducting an on-line reverse auction and a negotiation comprising the steps of:
   a. presenting a product selection from a web server to a buyer;
   b. receiving product information selected by the buyer;
   c. generating a sales lead including at least a zip code and an email address;
   d. authorizing the buyer to post a request for a quote for a product after generating the sales lead;
   e. posting the request for the quote from the buyer;
   f. searching for at least one seller authorized to sell the product requested by the buyer based on information provided by the buyer;
   g. notifying the authorized sellers of the buyer including preferences with the request for the quote;
   h. allowing the sellers not previously notified to join into the negotiation process;
   i. permitting the authorized sellers to post the quote and relevant information in response to the request for the quote from the buyer;
   j. utilizing the web server to calculate a buyer rating from data provided by the buyer in order to determine a quality of the sales lead;

k. informing the sellers of the buyer rating;

l. providing an environment on the web server to conduct the negotiation between the buyer and the sellers during the on-line reverse auction; and m. determining an endpoint for the on-line reverse auction and the negotiation process for the product.

2. The method of claim 1, wherein the buyers, the sellers and the web server of the present invention communicate over the internet.

3. The method of claim 1, wherein information is collected from and presented to the buyers and the sellers via web pages generated by the web server.

4. The method of claim 1, wherein authentication, authorization and level of access of use of the web server by the buyers and the sellers are implemented based on a unique identifier and a secure password assigned to the buyer and the sellers during registration and stored in a database.

5. The method of claim 1, wherein the buyer's request for the quote is assigned a unique identifier depending upon the product selection and the buyer's identifier stored in a database.

6. The method of claim 1, wherein the search of the sellers authorized to sell the product selection are implemented based on the buyer's location information.

7. The method of the claim 1, wherein notification of the sellers selected includes an invitation to take part in the on-line reverse auction and negotiation process implemented through an email message.

8. The method of claim 1, wherein the identity of the sellers taking part in the on-line reverse auction and the negotiation process is revealed to at least the buyer that is participating.

9. The method of claim 1, wherein the identity of the buyer posting the request for the quote, can be revealed only with the buyer's approval.

10. The method of claim 1, wherein the environment for the on-line auction and the negotiation process is implemented as a real time forum, where all posted information, including the quotes and all the additional information, is available for viewing by the buyer and the sellers that are participating.

11. The method of claim 1, wherein the seller can request additional information from the buyer to improve the quality of the sales lead.

12. The method of claim 1 having the additional step of channeling collected information from the potential buyers into the web server using a specialized software module embedded into affiliated web sites for generating the sales lead.

* * * * *